H. W. SHERMAN.
DIFFERENTIAL MECHANISM FOR VEHICLES.
APPLICATION FILED FEB. 28, 1914.
1,134,235.
Patented Apr. 6, 1915.
2 SHEETS—SHEET 1.
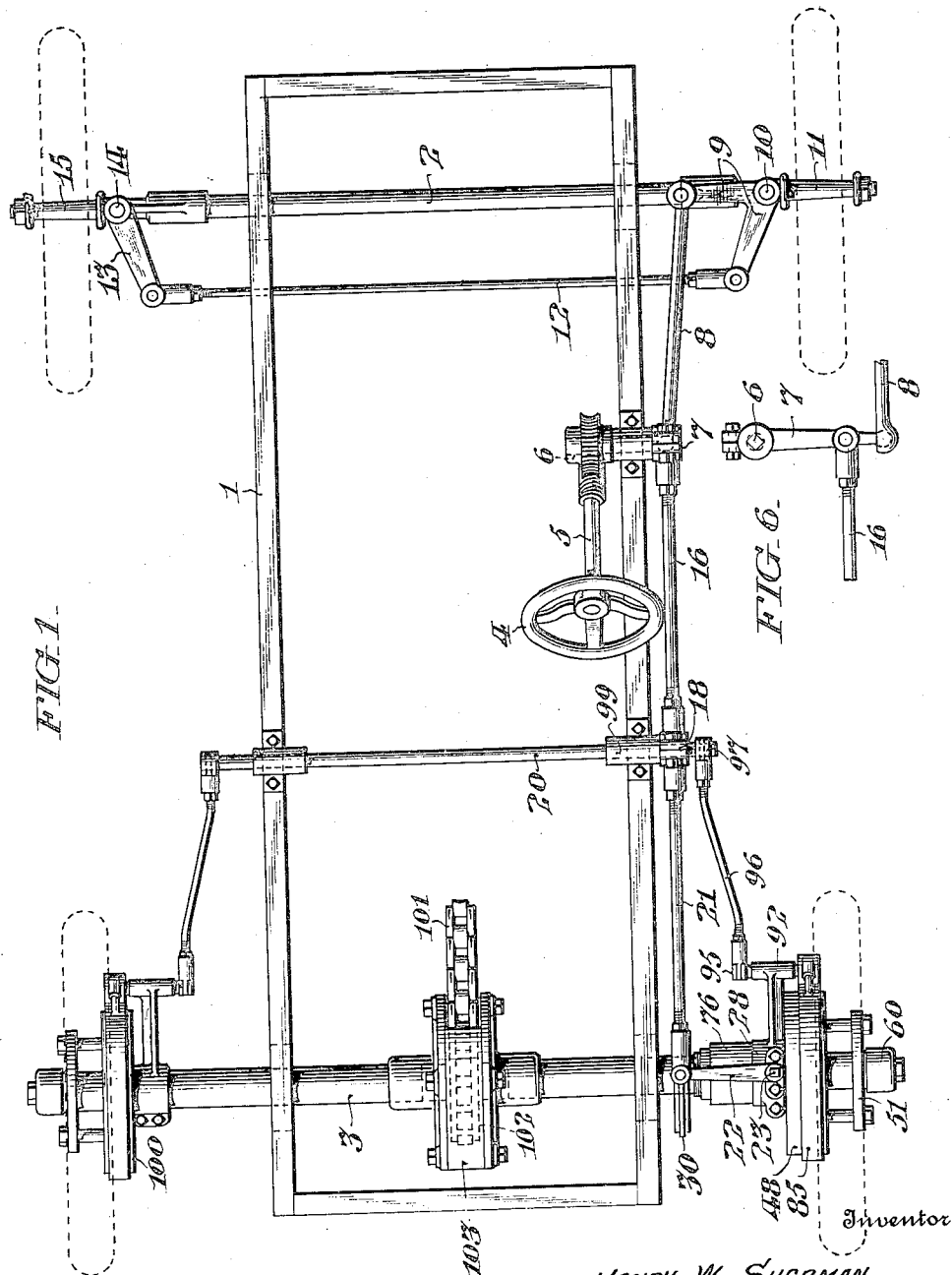
Witnesses
J. O'R. Kelly,
Chas. Lane
Inventor
HENRY W. SHERMAN,
Attorney

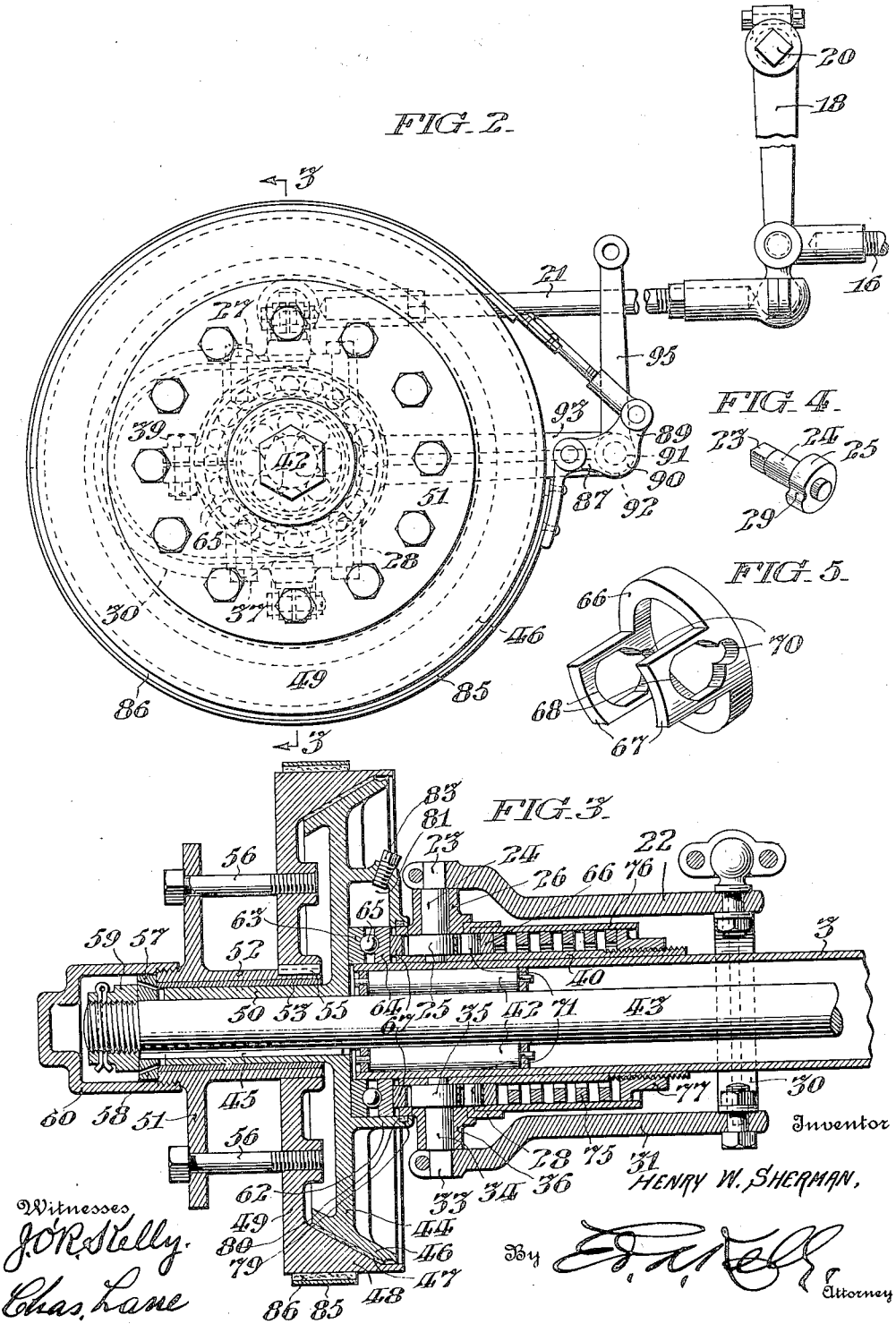

UNITED STATES PATENT OFFICE.

HENRY W. SHERMAN, OF READING, PENNSYLVANIA, ASSIGNOR OF ONE-HALF TO ELMER L. SCHRECK, OF READING, PENNSYLVANIA.

DIFFERENTIAL MECHANISM FOR VEHICLES.

1,134,235.  Specification of Letters Patent.  Patented Apr. 6, 1915.

Application filed February 28, 1914. Serial No. 821,685.

*To all whom it may concern:*

Be it known that I, HENRY W. SHERMAN, a citizen of the United States, residing at Reading, in the county of Berks and State of Pennsylvania, have invented certain new and useful Improvements in Differential Mechanism for Vehicles, of which the following is a specification.

This invention relates particularly to the transmission mechanism for automobiles, and is directed especially to that part of the transmission known as the "differential," and whereby the driving wheels may rotate at relatively different speeds so as to permit the vehicle to deviate from a straight course.

The most common form of differential mechanism comprises a driven chain of differential or compensating gears connecting the opposed ends of separate, relatively rotatable sections of the driving shaft, the said sections being respectively connected in rigid relation with the driving wheels at the opposite sides of the machine.

The principal object of my invention is, to provide simple and efficient differential mechanism whereby the driving wheels of a vehicle are positively connected to be driven synchronously when traversing a straight course, but are automatically disconnected for relative rotation upon traversing a curved course, without the employment of any form of differential or compensating gears.

Other objects of my invention are, to provide differential mechanism with an undivided driving shaft normally connecting the driving wheels at the opposite sides of the machine, in rigid relation with respect to each other; and to provide means controlled by the steering mechanism operative to permit the relative rotation of the driving wheels when actuated to turn the machine from the straight course.

Specifically stated, my invention comprehends a unitary driving shaft connecting the driving wheels by a clutch which normally connects said driving wheels with said shaft, but which is arranged to be automatically released when the operator directs the vehicle from the straight course, by a link and lever connection with the steering mechanism.

My invention also includes all of the various novel features of construction and arrangement of the parts as hereinafter more definitely specified.

In the accompanying drawings, Figure 1 is a diagrammatic plan view of the chassis of an automobile, showing generally the layout of the steering gear and differential mechanism embodying a convenient form of my invention; Fig. 2 is a side elevational view of the differential mechanism and the parts directly associated therewith; Fig. 3 is a longitudinal fragmentary sectional view taken axially through the differential mechanism on the line 3—3 in Fig. 2; Fig. 4 is a perspective view of the cam for releasing the clutch of the differential mechanism; Fig. 5 is the follower which is actuated by the cam shown in Fig. 4; and Fig. 6 is a fragmentary side view of the rocker-arm of the steering mechanism and the connecting parts.

In said figures, the chassis comprises the frame 1 conveniently supported upon the front and rear axles 2 and 3, and carries the steering wheel 4 whose shaft 5 may be connected in any well-known manner to rotate the rock-shaft 6, from which depends the rocker-arm 7 which is connected by the link 8 with the free end of the lever 9 on the pivot-post 10 of the knuckle carrying the right front wheel spindle 11, the lever 9 being connected by the link 12 with the lever 13 on the pivot-post 14 of the knuckle carrying the left front wheel spindle 15.

The rocker-arm 7 is connected by the link 16 to the rocker-arm 18, which is carried by the rock-shaft 20 and which in turn is connected by the link 21 with the lever 22, which is rigidly secured on the projecting squared end 23 of the shank 24 of the cam 25, which, as best shown in Fig. 4, is provided with the recess 29. Said cam shaft 24 is suitably journaled in the cam bearing 26 which is secured by the tap bolts 27 to the cam casing 28.

The lever 22 is connected by the yoke 30 with the counterpart lever 31, which is rigidly secured on the squared projecting end 33 of the shank 34 of the cam 35, which being like the cam 25 is suitably journaled in the cam bearing 36 in axial alinement with said cam 25, said bearing 36 being secured by the tap bolts 37 to the cam casing 28 on the side opposite the cam bearing 26.

The cam casing 28 is split at one side and, as best shown in Fig. 3, may be clamped in removable relation on the tubular axle 3 by the bolt 39, and has the inwardly extending sleeve 40 snugly fitted to the exterior surface of said axle.

The axle 3 is provided near its ends with bearing rollers 42 for the driving shaft 43, which carries the clutch 44 secured thereon by the key 45, and having the angularly disposed rim 46, which presents a frusto-conical surface which is arranged to be frictionally engaged with a similarly inclined frusto-conical surface on the rim 48 of the inner plate 49 of the driving wheel hub. Either of the said frusto-conical surfaces may be provided with a facing 47 of suitable frictional material, such as leather.

The clutch 44 is provided with an outwardly extending hub sleeve 50, which forms a hollow spindle upon which the hub of the driving wheel rotates. The outer plate 51 of the wheel hub is provided with a hub sleeve 52 which extends both inwardly and outwardly and is provided with a bushing 53 of suitable bearing material snugly fitted to rotate on the spindle formed by the hub sleeve 50.

The inner hub plate 49 is mounted on the inner extension of the hub sleeve 52 and is prevented from relative rotation thereon by the key 55 and by the bolts 56, which are arranged to connect said hub plates 49 and 51 and to bind the spokes (not shown) of the driving wheels therebetween.

The outer edge of the hub sleeve 52 bears against the thrust collar 57, which is provided with oil passages 58 and which is held in place on the driving shaft 43 by the nut 59 in threaded engagement with said shaft. The hub sleeve 52 is also provided with external screw threads for the threaded engagement of the cap 60, which is arranged to provide a cover for the end of the shaft 43 and the bearing members thereon, and to also provide a reservoir for lubricating oil for said bearing members.

The inner clutch 44 is provided with an inwardly extended circular rib 62, which forms a suitable recess or casing for the thrust bearing, comprising the bearing disks 63 and 64 and the interposed bearing balls 65. Mounted within the cam casing 28 and bearing against the plate 64 is a follower, which, as best shown in Fig. 5, comprises an annular collar 66, from the forward side of which projects oppositely disposed wings 67, respectively having elongated axially alined apertures 68, into which the cams 25 and 35 project. The apertures 68 merge into smaller apertures 70 in the annular collar 66, which serve as a housing for the rollers 71, the peripheries of which are arranged with the cams 25 and 35, as best shown in Fig. 3, and normally disposed in the recesses 29 in said cams when the clutch rim 46 is in operative engagement with the rim 48 of the wheel hub plate 49, as shown in Fig. 3.

The operative engagement of the clutch and hub is automatically effected by the pressure of the spiral spring 75 which encircles the sleeve 40 and is disposed in the annular space between said sleeve 40 and the spring casing formed by the inwardly extending tubular projection 76 on the cam casing 28. Said spring 75 bears at one end against the annular collar 66 of the follower and at the other end against the nut 77, which is in threaded engagement with the sleeve 40 and therefore adjustable to vary the tension of said spring 75.

As best shown in Fig. 3, the rib 62 forms a telescopic connection with the cam casing 28 and has the internal groove 79 for packing 80 to retain the oil and to exclude dust. Said rib is extended at one side to provide a pocket 81 for lubricant, which may be inserted through the opening provided with the screw-threaded closure 83.

The rim 48 affords a suitable brake drum, which is embraced by the brake band 85 having the friction-producing facing 86, and having its opposite ends connected with the respective arms 87 and 89 of the bell-crank-lever 90, which is carried by the rock-shaft 91, journaled in the bearing 92 in the end of the bracket arm 93 which projects forwardly from the cam casing 28.

The rock-shaft 91 carries the lever 95 which is connected by the link 96 with the lever 97 on the rock-shaft 20, which is journaled in bearings 99 on the frame 1 of the chassis, and actuated to set the brakes in any suitable manner. The brake mechanism at the opposite side of the machine is a counterpart of the mechanism above described, and is similarly effective upon the brake drum 100.

It will be obvious from the foregoing description that when the steering wheel is in the position to direct the vehicle in a straight course, the clutch mechanism will be operative to connect the driving wheel with the driving shaft, but when said steering wheel is actuated to divert said vehicle from the straight course, the movement of the rocker-arm 7 either forward or backward, to turn the vehicle either to the right or to the left, will impart a similar movement to the levers 22 and 31 and thereby rotate the respective cams 25 and 35 and cause the rollers 71 to ride from the recesses 29 in said cams to the higher portions or portions of greatest diameter, which movement effects a movement of the follower inwardly from the clutch and relieves said clutch from the pressure of the spring 75, so that the driving wheel whose hub is formed by the members 49 and 51 is free to rotate about the shaft at a faster or slower speed than said shaft, depending upon the direction in which the vehicle is turned.

My invention is particularly advantageous in that the usual train of differential gearing may be entirely eliminated and the driving shaft 43 be formed in one piece extending from one driving wheel to the other. Furthermore, a direct transmission is obtained from the motor, which may be of any type or motive power, and directly connected by a shaft or chain 101 with the driving gear 102, which may be secured on said shaft 43 and protected by the gear casing 103 on the tubular axle 3.

It is to be understood that while the differential mechanism herein shown and described is applied to but one of the driving wheels, it may as readily be employed in connection with both of the driving wheels, and operative to effect the operation of one or the other in accordance with the direction in which the vehicle may be turned.

I do not desire to limit my invention to the precise details of construction and arrangement herein set forth, as it is obvious that various modifications may be made therein without departing from the essential features of my invention as defined in the appended claims.

Having thus described my invention, I claim:

1. In differential mechanism for vehicles, the combination with driving wheels, of an undivided driving shaft rigidly connected with one of said wheels, a clutch operatively connecting said shaft with the other wheel, a spring normally tending to press the driving member of said clutch into engagement with the driven member, a cam arranged to retract said spring and thereby release said members, a lever engaged with the shank of the cam, a yoke connecting the free end of the lever, steering mechanism for said vehicle, and means connecting said cam with said steering mechanism operative to rotate said cam to the position to retract said spring when said steering mechanism is actuated to divert said vehicle from the straight course.

2. In differential mechanism for vehicles, the combination with steering mechanism, of driving wheels, an undivided shaft connecting said wheels and being rigidly connected with one of said wheels, a clutch connecting said shaft with the other wheel and comprising relatively movable frictional driving and driven members, a spring normally tending to hold said members in operative engagement, a follower interposed between said spring and driving member and comprising an annular body provided with diametrically opposite wings extending parallel with its axis and having alined apertures, a cam operative to shift said follower to retract said spring and thereby release said clutch members, and means connecting said cam and steering mechanism to effect the rotation of said cam and the consequent release of said clutch members when said steering mechanism is actuated to divert said vehicle from its straight course.

3. In differential mechanism for vehicles, the combination with steering mechanism, of driving wheels, an undivided shaft connecting said wheels, and being rigidly engaged with one of said wheels, a clutch connecting said shaft with the other wheel and comprising relatively movable frictional driving and driven members, a spring embracing said shaft and normally tending to hold said members in operative engagement, a follower interposed between said clutch and said spring, and comprising an annular body provided with diametrically opposite wings extending parallel with its axis and having alined apertures, cams having a recess in one side of their periphery, disposed in said apertures in axial alinement with each other and respectively having projecting shanks, a roller in each of said apertures coöperatively engaged with the periphery of the respective cams, and arranged to normally rest in said recesses, but to ride to the higher periphery of said cam when rotated, and thereby shift said follower to compress said spring and relieve said clutch members, means to adjust the tension of said spring, levers engaged with the shanks of the respective cams, a yoke connecting the free ends of said levers, and means connecting said levers with the steering mechanism whereby the actuation of said steering mechanism to divert the vehicle from the straight course will actuate said cams to retract said follower and permit the clutch-connected wheel to rotate relative to said driving shaft, and a wheel rigidly mounted on said driving shaft arranged to be directly connected with any desired form of power generator.

In testimony whereof I affix my signature in presence of two witnesses.

HENRY W. SHERMAN.

Witnesses:
Ed. A. Kelly,
Wm. H. K. Bush.